United States Patent [19]

Brown

[11] Patent Number: 4,658,759

[45] Date of Patent: Apr. 21, 1987

[54] ADJUSTABLE DOG FEEDING TRAY MEANS

[76] Inventor: Elizabeth A. Brown, 8005 Anderson St., Philadelphia, Pa. 19118

[21] Appl. No.: 754,011

[22] Filed: Jul. 11, 1985

[51] Int. Cl.$^4$ .............................................. A01K 5/00
[52] U.S. Cl. ..................................................... 119/61
[58] Field of Search .................... 119/51, 51.5, 61, 16; 108/116, 125, 146

[56] References Cited

U.S. PATENT DOCUMENTS

| | | | |
|---|---|---|---|
| 2,106,436 | 1/1938 | Pyle | 108/125 |
| 2,712,677 | 7/1955 | Hyde | 119/16 |
| 4,044,723 | 8/1977 | Fitzpatrick | 119/51.5 |
| 4,065,195 | 12/1977 | Fahmie | 119/61 |

FOREIGN PATENT DOCUMENTS 2440174 7/1980 France ............................. 108/146

Primary Examiner—Hugh R. Chamblee
Attorney, Agent, or Firm—Jacob Trachtman

[57] ABSTRACT

An adjustable dog feeding tray means which comprises a member providing a rectangular plate having four corners and a horizontal plane surface with an opening therein, and a feeding bowl received and removably retained within the opening of the plate. A plurality of the legs which are secured with the member are controllably extendible and retractable for adjusting the height of the plate. Each leg is also hingedly secured with the plate at a one of its respective corners for being rotated to a position proximate to the plate when the tray means is stored or transported and rotated away from the plate when the tray means is in use.

12 Claims, 4 Drawing Figures

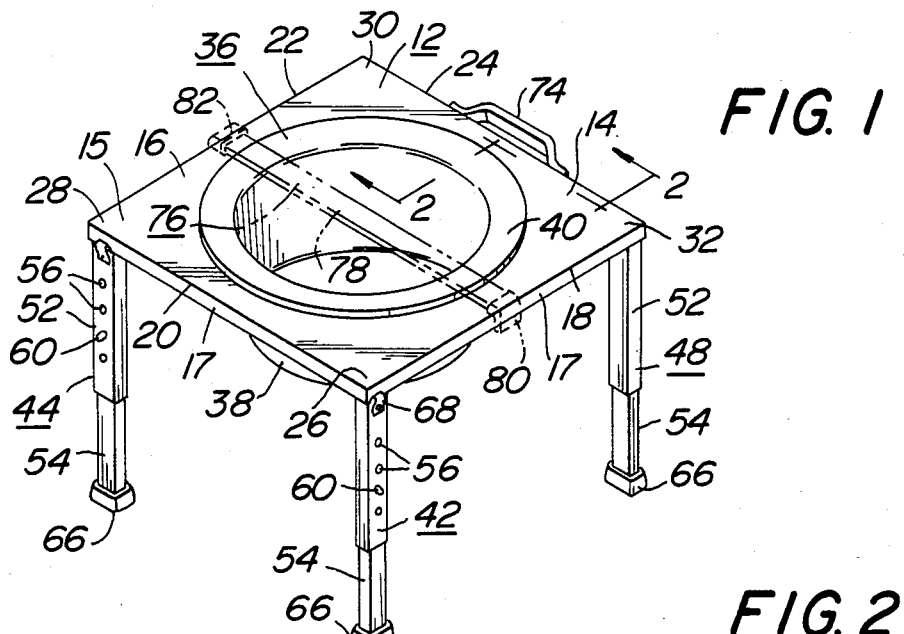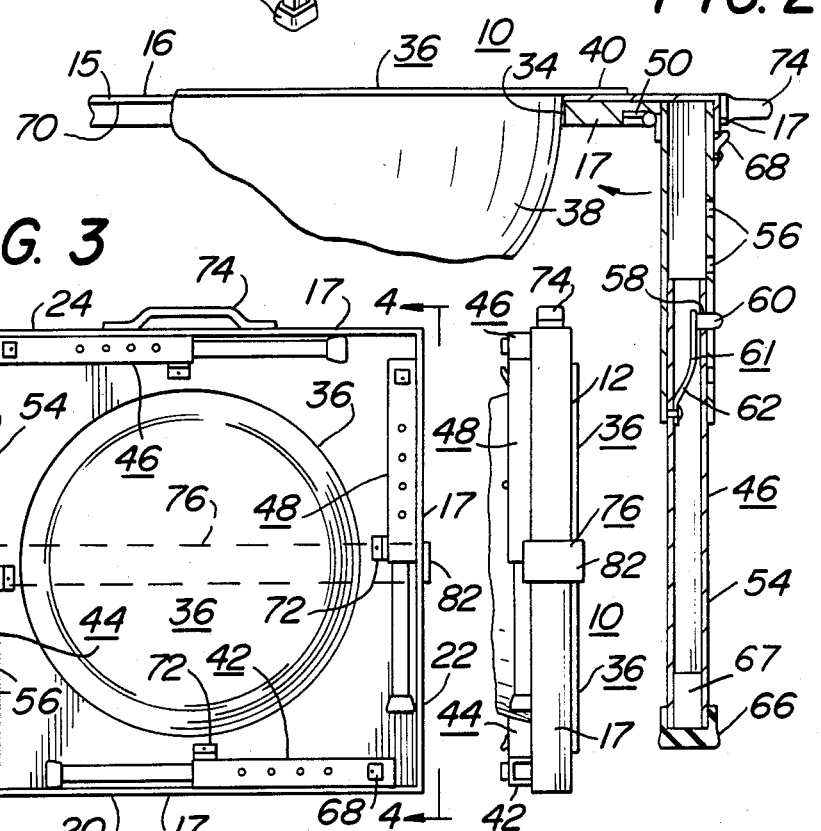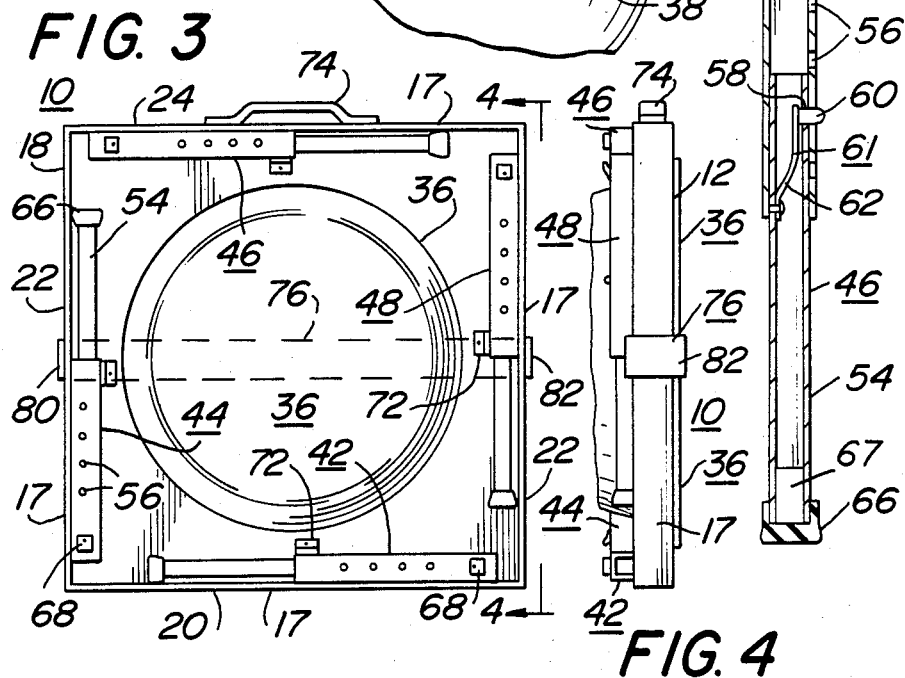

ADJUSTABLE DOG FEEDING TRAY MEANS

BACKGROUND OF INVENTION

The invention relates to an adjustable dog feeding tray means, and more particularly to a dog feeding tray having a removable feeding bowl and provided with controllable legs for adjusting the height of the feeding bowl.

Although feeding trays for dogs have been provided in the past, such devices have not been easily adjustable for the various sizes of the animals being fed, and could not be collapsed to a substantially flat form for ready transport and storage. It is also important that such devices be highly stable and easily movable from one location to another. It is therefore an object of the invention to provide such advantages and overcome the disadvantages of the prior art.

It is, therefore, a principal object of the invention to provide a new and improved adjustable dog feeding tray means which may easily have its height adjusted to accommodate dogs of various height.

Another pbject of the invention is to provide a new and improved adjustable dog feeding tray means which is easily collapsed to a substantially flat condition for storage or being transported.

Another object of the invention is to provide a new and improved adjustable dog feeding tray means accommodating small dogs as well as dogs of greater height by adjusting the length of the legs of the tray means.

Another object of the invention is to provide a new and improved adjustable dog feeding tray means which can be controllably adjusted to the particular height required by a dog to improve its posture, reduce possibility of blgat by aiding the digestive process, and producing or minimizing back misalignment and disc problems.

Another object of the invention is to provide a new and improved adjustable dog feeding tray means, accommodating bowls of various sizes depending upon the requirements of the dogs which are to be fed.

Another object of the invention is to provide a new and improved adjustable dog feeding tray means which is highly stable and rugged and will not easily be upset by large dogs, and is readily moved from place to place.

Another object of the invention is to provide a new and improved adjustable dog feeding tray means which is light in weight, easily cleaned and resists corrosion and rust.

Another object of the invention is to provide a new and improved adjustable dog feeding tray means in which one or more tray means may be collapsed and stored next to each other in minimum space or may be nestled one above the other in their uncollapsed conditions.

Another object of the invention is to provide a new and improved adjustable dog feeding tray means which will minimize tripping over bowls resting on the floor for reducing accidents.

Another object of the invention is to provide a new and improved adjustable dog feeding tray means which may easily be produced, is inexpensive to manufacture and maintain in operating condition, and is highly reliable and of rugged construction.

The above objects, as well as many other objects of the invention, are achieved by providing an adjustable dog feeding tray means which comprises a member providing a rectangular plate having four corners and a horizontal plane surface with an opening therein, and a feeding bowl received and removably retained within the opening of the plate. A plurality of legs are secured with the member and are controllable for adjusting the height of the member. A respective one of each of the legs is secured to the plate at each of its corners and is extendible and retractable for adjusting its length and the height of the plate. Each leg is also hingedly secured with the plate for being rotated to a position proximate to the plate when the tray means is stored or transported and rotated away from the plate when the tray means is in use.

The plate has a rectangular perimeter with four equal sides so that each of the legs is foldable to lie along a respective one of the sides of the plate and is retractable to be contained within the perimeter of the plate for placing the tray means in a collapsed substantially flat condition. The legs have telescoping portions for adjusting their extension with detent means for retaining their telescoping portions at selected extensions, and the plate is provided with contact means for engaging and retaining the legs in either of their folded and unfolded positions.

The plate includes securing means for retaining and preventing displacement of the bowl from within the opening when the tray means is stored or transported, and comprises an elastic band extendible over the bowl and plane surface of the plate and having a clip at each of its ends for respectively engaging opposite sides of the plate. One of the sides of the plate is provided with a handle for carrying the tray means when the tray means is in its collapsed condition.

BRIEF DESCRIPTION OF THE DRAWING

The above objects as well as many other objects of the invention will become apparent from the following detailed description thereof provided in connection with the drawing, in which:

FIG. 1 is a perspective view of an adjustable dog feeding tray means embodying the invention, FIG. 2 is an enlarged sectional view taken on the line 2—2 of FIG. 1, FIG. 3 is a bottom plan view of the feeding tray means of FIG. 1 in its collapsed condition, and FIG. 4 is a right end elevational view taken on line 4—4 of FIG. 3.

Like numerals designate like parts throughout the several views.

DETAILED DESCRIPTION

Referring to the figures, FIG. 1 is a perspective view of an adjustable dog feeding tray means 10 embodying the invention. The dog feeding tray means 10 includes a top member 12 comprising a plate 14 which may be made of a light strong material such as aluminum. The plate 14 is provided with main portion 15 providing a plane top surface 16 and downwardly extending portions 17 at its edges for providing strength and rigidity.

The plate 14 has a rectangular configuration providing sides 18, 20, 22 and 24 of equal length forming therebetween corners 26, 28, 30 and 32. The plate 14 is provided with an opening 34 of circular configuration extending through the top surface 16 of the main portion 15 of the plate 14. A bowl 36 which may also be made of a lightweight metal for containing animal food has a tapered bottom portion 38 which is received through the opening 34 of the plate 14, and a radially extending lip 40 at its top which overlies the top surface 16 of the plate 14 for supporting the bowl in position on the plate 14.

The plate 14 is supported by four legs 42, 44, 46 and 48, each respectively secured at a corner 26, 28, 30 and 32 of the plate 14 by a respective hinge 50. Each of the legs 42, 44, 46 and 48 is adjustable in length for supporting the plate 14 at a height to accommodate dogs of various height, which may be from 10 to 20 inches in height. For this purpose, the legs 42, 44, 46 and 48 are each provided with a top tubular portion 52 which telescopically receives within it a bottom tubular portion 54. The tubular portions 52 and 54 are preferably made of a strong and lightweight material such as aluminum and desirably have a rectangular cross section. The top tubular portion 52 of each of the legs is hingedly secured to the plate 14 by one of the hinges 50, and has a plurality of spaced openings 56 linearly arranged along its length. The bottom tubular portions 54 which also have a rectangular cross section are of smaller dimensions for being slidably received within their respective upper tubular portions 52. Each of the bottom portions 54 is provided with an opening 58 which movably receives therethrough the pin 60 of a detent means 61. The pin 60 is secured to the top end of a spring arm 62 which is positioned within the bottom tubular portion 54 and has its other end secured with the portion 54 by screw means 64. Thus, when the pin 60 is in alignment with an opening 56 of the top tubular portion 52, the spring lever 62 moves the pin 60 through such aligned opening for fixing the extension of the lower portion 54 with respect to the upper portion 52. The bottom end of the bottom portion 54 of each of the legs 42, 44, 46 and 48 is provided with a rubber-tipped foot 66 and weight 67 to provide stability for the feeding tray means 10 which is most important for large dogs. The top end of each of the top sections 52 of the legs is provided with a spring contact element 68 which frictionally engages the downwardly extending portions 17 of the plate 14 when the legs are extended in their vertical positions as shown in FIGS. 1 and 2 for retaining and adding additional stability to the legs by minimizing their accidental movement about their hinges 50.

A bowl retaining means 76 comprising an elastic strap portion 78 is provided for retaining the bowl 36 within the opening 34 by extending across the top of the bowl and its lip 40 and over the top surface 16 of the plate 14. The strap portion 78 is retained in position by clips 80, 82 at opposite ends of the strap portion 76 which detachably extend over and engage the opposite downwardly extending portions 17 at the edges 18 and 22 of the plate 14. The strap portion 78 is dimensioned for being stretched when it is in position, resulting in an elastic force retaining it in place, and can be readily removed when this is desired by further stretching. By use of the bowl retaining means 76, the feeding tray means 10 may readily be transported or stored as a unit without the danger of displacement or loss of its bowl 36. A handle 74 secured with the side 24 of the plate 14 is provided for carrying the tray means 10, when the tray means is in its collapsed condition.

In operation, the adjustable dog feeding tray means 10 is positioned as shown in FIG. 1 with the legs extending substantially perpendicularly to the plate 14. The length of each of the legs 42, 44, 46 and 48 is adjusted by pressing the extending end of the pin 60 inwardly to allow sliding movement between the upper and lower sections 52 and 54 of each of the legs for extending or retracting the lower section 54 of the leg to provide the desired extension. A bowl 36 of suitable capacity is placed into the opening 34 of the plate 14 and filled with food as required for feeding the particular dog for which the feeding tray means 10 is provided. The bowl may readily be removed for cleaning and replacement as required, and different size bowls may also be substituted for accommodating the needs of the animal. The dog feeding tray means 10 may have its height adjusted from time to time as required, as where this is required by the growth of the dog. The proper adjustment for the particular animal is very important especially for dog breeding where the dog's posture (top line) is an important consideration. The proper height also reduces the possibility of bleat by aiding the digestive process, and may avoid or alleviate spinal disc problems of the animal.

When the dog feeding tray means 10 is in use, it may readily be moved from one place to another since its structure does not require that it be secured with a fixed post or other such immobile structure. If several feeding tray means 10 are utilized in the same household, and are adjusted for different heights, they may readily be nestled one over the other. An important feature and advantage of the present adjustable dog feeding tray means 10, is provided by its ability to be completely collapsed to a substantially flat condition as illustrated in FIGS. 3 and 4. In this condition, each of the legs 42, 44, 46 and 48 is retracted from its extended position to its completely collapsed condition in which the lower portions 54 are moved into the upper portions as shown in FIG. 3. Each of the legs 42, 44, 46 and 48 is then rotated about its hinge 50 from its unfolded position shown in FIGS. 1 and 2 toward its folded position shown in FIGS. 3 and 4 proximate to the under surface 70 of the main portion 15 of the plate 14. When the legs 42, 44, 46 and 48 are moved proximate to the under surface 70 of the plate 14, each extends along a respective edge 20, 22, 24 and 26 of the plate 14 and lies within the boundary of the top member 12. Spring clips 72 secured with the under surface 70 of the plate 14 are provided for frictionally engaging the upper portion 52 of each of the legs and retaining same in their folded position. In its completely collapsed condition, the adjustable dog feeding tray means 10 is substantially flat in configuration and may be stacked or compactly positioned next to each other. The feeding tray means 10 may also readily be transported in its collapsed condition by the handle means 74 secured to the plate 14 at its edge 24.

It will, of course, be understood that the description and drawings, herein contained, are illustrative merely, and that various modifications and changes may be made in the structure disclosed without departing from the spirit of the invention.

What is claimed is:

1. An adjustable dog feeding tray means comprising a bowl supporting member including a rectangular plate providing four corners and having a horizontal plane surface with an opening therein, a feeding bowl received and removably retained by the member within the opening of the plate, and a plurality of legs for supporting the member each having a top end and a bottom end, the top end of a respective one of the legs being hingedly secured to the plate at each of its corners, and each leg being rotatable to a first closed position proximate to the plate to provide a collapsed form with the bowl retained by the member within the opening of the plate when the tray means is stored or transported and to an open position away from the plate when the tray means is in use, and each of the legs is extendible and retractable for adjusting its length and the height of the plate.

2. The feeding tray means of claim 1 in which the plate has four equal sides providing a rectangular perimeter, and each of the legs is foldable to lie along a respective one of the sides of the plate and is retractable to be contained within the perimeter of the plate for placing the tray means in a collapsed substantially flat condition.

3. The feeding tray means of claim 1 in which the plate includes securing means for retaining and preventing displacement of the bowl from within the opening of the plate when the tray means is stored or transported.

4. The feeding tray means of claim 3 in which the plate has four equal sides providing a rectangular perimeter, and each of the legs is foldable to lie along a respective one of the sides of the plate and is retractable to be contained within the perimeter of the plate to place the tray means in a collapsed substantially flat condition.

5. The feeding tray means of claim 3 in which the bowl retaining means comprises an elastic band extendible over the bowl and plane surface of the plate and a clip at each end of the band for respectively engaging opposite sides of the plate, and the plate is provided with contact means for retaining the legs in either of their folded and unfolded conditions.

6. The feeding tray means of claim 1 in which the legs have telescoping portions for adjusting their extension.

7. The feeding tray means of claim 6 in which the legs have detent means for retaining their telescoping portions at selected extensions.

8. The feeding tray means of claim 7 in which the bowl retaining means comprises an elastic band extendible over the bowl and plane surface of the plate and having a clip at each end of the band for respectively engaging opposite sides of the plate.

9. The feeding tray means of claim 7 in which the telescoping portions of each of the legs comprise a first portion hingedly secured with the plate and a second portion movably received within the first portion, the first portion has a plurality of spaced openings therealong while the second portion has an opening and a pin urged for extending through the opening thereof and through an aligned opening of the first portion for providing the detent means for retaining the telescoping portions at selected extensions.

10. The feeding tray means of claim 9 in which the plate has four equal sides providing a rectangular perimeter, and each of the legs is foldable to lie along a respective one of the sides of the plate and is retractable to be contained within the perimeter of the plate for placing the tray means in a collapsed substantially flat condition and the bottom end of the second portion of each leg is provided with a rubber-tipped foot and a weight to provide stability when the legs are in the second position.

11. The feeding tray means of claim 6 in which the plate includes securing means for retaining and preventing displacement of the bowl from within the opening of the plate when the tray means is stored or transported, and the plate is provided with contact means for retaining the legs in either of their folded and unfolded positions.

12. The feeding tray means of claim 11 in which the bowl retaining means comprises an elastic band extendible over the bowl and plane surface of the plate and a clip at each end of the band for respectively engaging opposite sides of the plate, and one of the sides of the plate is provided with a handle means for carrying the tray means when the tray means is in its collapsed condition.

* * * * *